(12) United States Patent
Verplaetse et al.

(10) Patent No.: US 6,721,738 B2
(45) Date of Patent: Apr. 13, 2004

(54) MOTION PASSWORD CONTROL SYSTEM

(75) Inventors: Christopher Verplaetse, Cambridge, MA (US); Christopher Turner, Belmont, MA (US); W. David Lee, West Newton, MA (US); Martin Wells, Needham, MA (US)

(73) Assignee: Gaveo Technology, LLC., West Newton, MA (US)

( * ) Notice: Subject to any disclaimer, the term of this patent is extended or adjusted under 35 U.S.C. 154(b) by 226 days.

(21) Appl. No.: 09/773,165

(22) Filed: Jan. 31, 2001

(65) Prior Publication Data

US 2001/0047488 A1 Nov. 29, 2001

Related U.S. Application Data

(60) Provisional application No. 60/178,971, filed on Feb. 1, 2000.

(51) Int. Cl.$^7$ .............................................. G06F 17/30
(52) U.S. Cl. ................ 707/6; 707/2; 707/9; 707/10; 702/141; 340/571; 345/741
(58) Field of Search ........................ 707/9, 10, 8, 100, 707/102, 103 R, 104.1; 340/571; 702/141; 713/202; 700/66; 345/158, 741

(56) References Cited

U.S. PATENT DOCUMENTS

| | | | | |
|---|---|---|---|---|
| 5,317,304 A | * | 5/1994 | Choi | 340/571 |
| 5,694,340 A | * | 12/1997 | Kim | 702/141 |
| 5,728,960 A | * | 3/1998 | Sitrick | 84/477 R |
| 5,729,734 A | | 3/1998 | Parker et al. | 707/9 |
| 5,821,933 A | | 10/1998 | Keller et al. | 345/741 |
| 5,886,634 A | * | 3/1999 | Muhme | 340/572.1 |
| 6,084,168 A | * | 7/2000 | Sitrick | 84/477 R |
| 6,102,284 A | | 8/2000 | Myers et al. | 235/375 |
| 6,144,314 A | | 11/2000 | Yasue | 340/573.1 |
| 6,161,071 A | * | 12/2000 | Shuman et al. | 701/48 |
| 6,353,785 B1 | * | 3/2002 | Shuman et al. | 701/48 |
| 6,509,830 B1 | * | 1/2003 | Elliott | 340/286.02 |
| 6,546,363 B1 | * | 4/2003 | Hagenbuch | 703/7 |

* cited by examiner

*Primary Examiner*—Shahid Alam
(74) *Attorney, Agent, or Firm*—Iandiorio & Teska; Marc Vivenzio (57) ABSTRACT

A motion password control system including a motion sensor responsive to motion of a device and providing a signal corresponding to movement of the device; a database including stored data values corresponding to predetermined motion of the device; and an electronic circuit, responsive to the motion sensor, configured to compare the motion sensor signal with the stored database values, and, in response, to provide an output signal for performing at least one action of a preselected set of actions when the comparison reveals that the device has moved in a way which corresponds to the stored data values.

19 Claims, 6 Drawing Sheets

MOTION PASSWORD CONTROL SYSTEM

RELATED APPLICATIONS

This application is based on and claims priority from Provisional Application Ser. No. 60/178,971 filed Feb. 1, 2000.

FIELD OF THE INVENTION

This invention relates to security mechanisms for electronic and other devices and in particular to a security mechanism for computers, firearms, cellular telephones, and the like which can be activated and deactivated simply by moving the device correctly according to a preselected "motion password".

BACKGROUND OF THE INVENTION

Traditional passwords, personal identification numbers (PINs) and other unique identifiers are often used to prevent unauthorized access to computers and other electronic devices.

Passwords and PINs, however, are sometimes forgotten thus preventing authorized personnel from accessing their own computers when needed. In other cases, the passwords and PINs are written down negating the confidentiality which is supposed to be associated with them.

Worse, the use of passwords and PINs do not adequately protect against theft of computers, especially portable computers (e.g., laptops and personal data assistants) and other portable electronic devices (e.g., cellular telephones) which, when stolen, can still often be used by bypassing or deciphering the password or PIN. Moreover, standard password and PIN protection schemes typically require that the electronic device be powered on in order to enter the password or PIN.

SUMMARY OF THE INVENTION

It is therefore an object of this invention to provide a motion password control system that utilizes a different kind of "password" to prevent unauthorized uses and theft of electronic devices.

It is a further object of this invention to provide such a system which overcomes the security problems associated with traditional passwords, personal identification numbers, and other unique identifiers.

It is a further object of this invention to provide such a system which can be configured to prevent unauthorized access to portable electronic devices and/or which prevents theft of portable electronic devices.

It is a further object of this invention to provide such a system which includes its own power source and thus does not require that the electronic device be powered on in order to enter the "motion password" and thereby operates both when the electronic device is on and when it is off.

This invention results from the realization that the problems associated with typed in passwords, personal identification numbers, and other unique identifiers including the security, memory, and theft problems associated therewith can be overcome by a chip set integratable with a device such as a laptop computer and which includes an accelerometer, a processor, and a memory, wherein the database of the memory includes a set of coordinate values corresponding to authorized movement of the computer (a "motion password") and the accelerometer, in combination with the processor, actively detects whether the user has moved the computer according to the motion password and, in response, either arms or disarms the security subsystem and/or an alarm accordingly.

This invention features a motion password control system comprising a motion sensor responsive to motion of a device and providing a signal corresponding to movement of the device; a database including stored data values corresponding to predetermined motion of the device; and an electronic circuit, responsive to the motion sensor, configured to compare the motion sensor signal with the stored database values, and, in response, to provide an output signal for performing at least one action of a preselected set of actions when the comparison reveals that the device has moved in a way which corresponds to the stored data values.

In one embodiment, the database includes data corresponding to a set of discrete orientations of the device and the electronic circuit further includes a timer and means for determining whether any movement of the device matches the set of orientations within predetermined time periods. In another embodiment, the database includes motion data indicative of an authorized path of movement.

The motion sensor is typically an accelerometer, the database may be resident in a memory device such as a programmable read only memory, and the electronic circuit may be embodied in a microcontroller.

The device may be a computer, cellular telephone, firearm, or other valuable or electronically controllable item. Typically, the system further includes an audible alarm subsystem responsive to the output signal of the electronic circuit. The audible alarm subsystem typically includes an audible alarm and means for arming and disarming the audible alarm subsystem in response to the output signal and means for activating the audible alarm when the audible alarm subsystem is armed and movement of the device does not match the database values. In some instances, the device may also include an electronic access locking subsystem and one preselected action is to change the state of the electronic access locking subsystem. If the device is a firearm with a firing locking mechanism, one of the predetermined set of actions is to change the state of the firing locking mechanism.

The electronic circuit may further be configured to prompt a user of the device to enter a motion password and to store the entered movement data values in the database.

This invention also features a method of controlling a device. The method includes sensing movement of the device, storing, in a database, values corresponding to predetermined motions of the device, comparing any motion of the device with the stored database values and, in response, providing an output signal for performing at least one action of a preselected set of actions when the comparison reveals that the device has moved in a way which corresponds to the stored data values.

The database typically includes data corresponding to a set of discrete orientations and the method then further includes determining whether any movement of the device matches the set of orientations within predetermined time periods. In other embodiments, the database includes motion data indicative of an authorized path of movement.

If the device includes an audible alarm subsystem including an audible alarm, the method may further include arming and disarming the audible alarm subsystem in response to the output signal and activating the audible alarm when the audible alarm subsystem system is armed and any movement of the device does not match the database values. If the device includes an electronic access locking mechanism, the method may further include allowing access when the movement of the device matches the database values. If the device is a firearm with a trigger locking mechanism, one of the predetermined set of actions is typically disarming the trigger locking mechanism. The method may also include prompting a user of the device to enter a motion password and storing the movement data values in the database.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
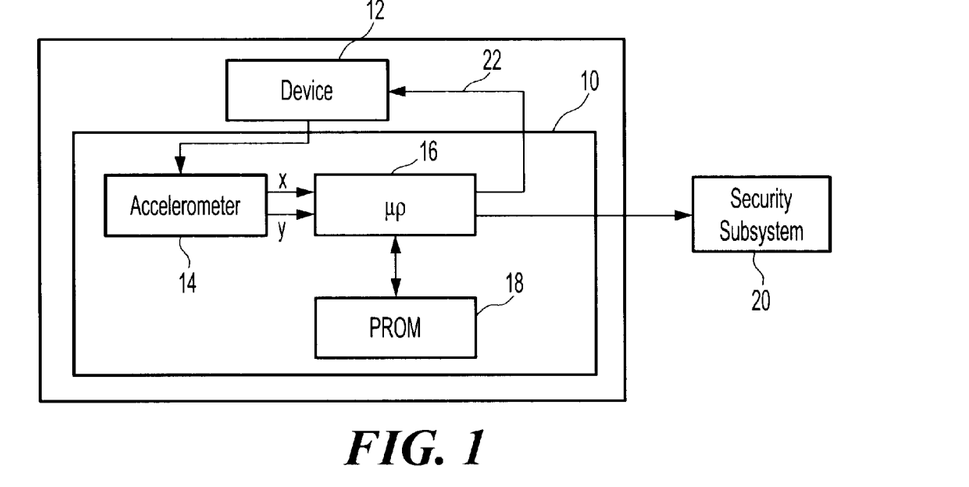
FIG. 1 is a block diagram showing the primary components associated with the motion password control system of the subject invention.

Motion password control system 10, FIG. 1 may be integrated as a chip set attached to or otherwise integrated with device 12 which may be an electronic device such as a laptop computer, a personal data assistant, a cellular telephone, or the like, or even other devices subject to theft and/or misuse such as a firearm as discussed infra.

The chip set includes accelerometer 14 or some other type of motion sensor responsive to movement of device 12 and which provides a signal corresponding to the movement of device 12 to processor or microcontroller 16 (or any other equivalent electronic circuitry). Stored in memory 18, which may be a EPROM, is a database of values ("the motion password") corresponding to predetermined motions or orientations of device 12.

In operation, when accelerometer 14 detects movement of device 12 and signals processor 16, processor 16 accesses the database of memory 18 and then one of two things happens: either the movement of device 12 corresponds to the values stored as the motion password; or the movement of device 12 does not correspond to the values stored as the motion password.

Figure 2:
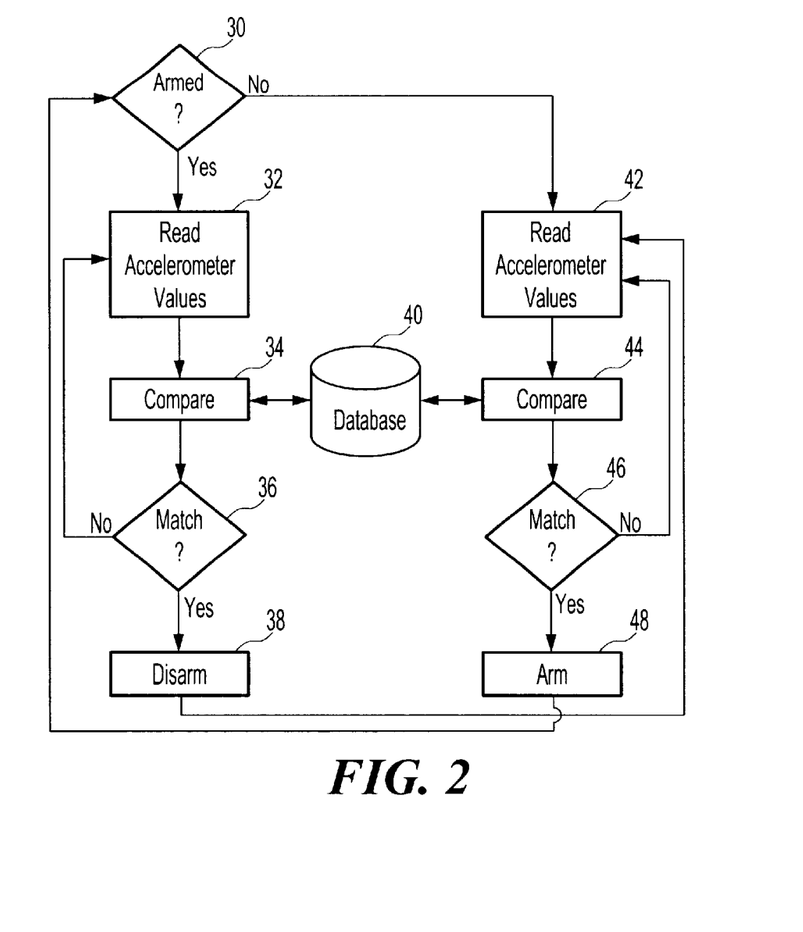
FIG. 2 is a flow chart depicting the general operation of the programming associated with the microprocessor or microcontroller of the motion password control system shown in FIG. 1.

Accordingly, the device is either "armed", step 30, FIG. 2 or disarmed which means a theft detection subsystem is either activated or not and/or a password based security subsystem is activated or not. In general, if the theft detection system is armed and the device is moved without entering the motion password, an alarm will be triggered. In addition, or alternatively, if the security system is armed and the device is moved without entering the motion password, the status quo will be maintained, i.e., the security system will remain armed and, for example, access to the computer's operating system and/or files will be denied. As such, chip set 10, FIG. 1 outputs a signal to security subsystem 20 to activate or deactivate it depending on whether first the motion password is entered and second the current state of security subsystem 20. Security subsystem may be integral with device 12 and/or integral with chip set 10.

If security subsystem 20 is armed, step 30, FIG. 2, microprocessor 16, FIG. 1 reads all accelerometer values step 32, FIG. 2 and compares, step 34, those values to the values stored in database 30 of EEPROM 18, FIG. 1.

If a match is found, step 36, FIG. 2, security subsystem 23, FIG. 1 is disarmed, step 38, FIG. 2. Access to the files and/or operating system of the computer is now allowed and/or an alarm will not sound if the computer is moved.

Conversely, if security subsystem 20, FIG. 1 is not armed or activated, the user can change its state by entering the motion password to prevent access to the computer and/or to cause an alarm to sound thereafter if the computer is moved in a way that does not correspond to the motion password.

Again, the accelerometer values are read, step 42, FIG. 2, a comparison with the database values is made, step 44, and if a match is found, step 46 the device is armed, step 48.

Figure 3:
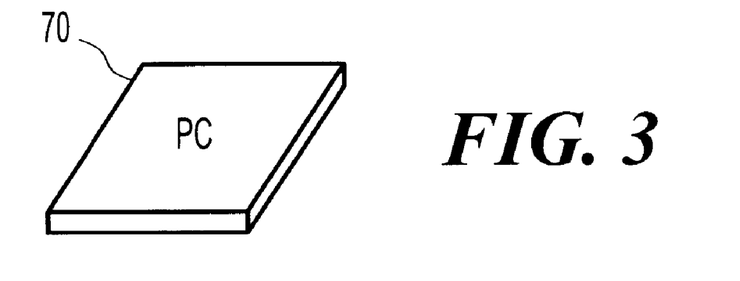
FIGS. 3–6 are schematic views showing how, in one example, the owner of a laptop computer "enters" the motion password in accordance with the subject invention.
Figure 4:
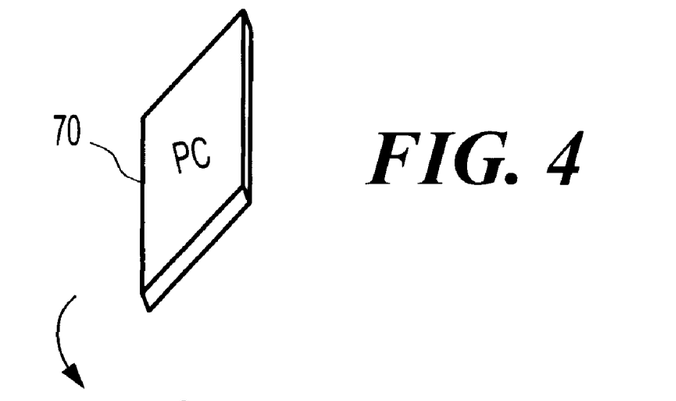
Figure 5:
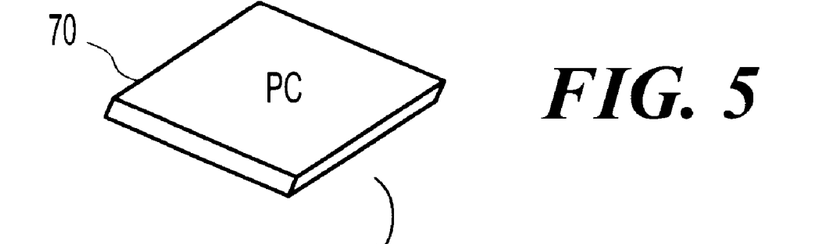
Figure 6:
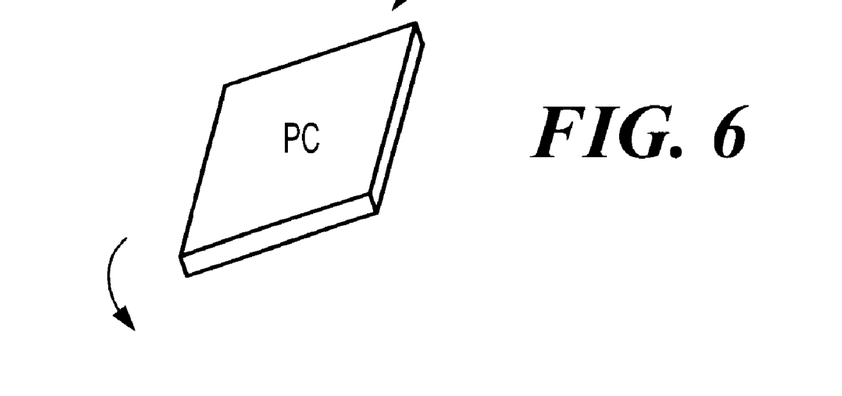

In one example, the owner of laptop computer 70, FIG. 3 decides that the motion password is a tilt downward 45° to the left, FIG. 4, a tilt downward to the right 45°, FIG. 5, and another 45° tilt downward to the left, FIG. 6 and these three orientations are stored as data by processor 16 in memory 18, FIG. 1 as authorized movement positions. Then, with the system activated by entering the motion password, the owner leaves the laptop computer on a desk, in a conference room, or on a table or seat in an airport and processor 16 in conjunction with accelerometer 14 continuously monitors all motion of laptop computer 70, step 30, FIG. 2 and compares any motion data to the data stored in memory 18, FIG. 1.

Upon returning, the owner again tilts the laptop computer downward to the left, downward to the right, and again downward to the left and processor 16, FIG. 1 compares these motions to the database values, finds that they match within some predetermined tolerance level, (and within a predetermined time as discussed below) and disarms or deactivates security subsystem 20, FIG. 1 and/or any corresponding theft detection subsystem. One such theft detection subsystem is disclosed in U.S. patent application Ser. No. 09/572,801 filed May 17, 2000 and owned by the applicant hereof. That disclosure is hereby incorporated herein. The user is then allowed access to the files and programs operating on laptop computer 70, FIG. 1 and/or can move the computer without sounding an alarm.

If, however, a thief who is not aware of the motion password takes the laptop computer and carries it away, the accelerometer signals output by accelerometer 14, FIG. 1 will not match the data stored in memory 18 in which case processor 16 may activate an alarm which emits an audible siren sound. In addition, or alternatively, under this scenario, any security mechanism associated with the laptop computer is not deactivated thereby preventing access to the authorized user's files and computer programs.

In one embodiment, the authorized motion password orientations must each occur within a predetermined time frame (e.g., 1 second) or else the sequence of accelerometer signals will be deemed not to match the database and the motion password will be invalid. Thus, system 10, FIG. 1 includes, typically as part of processor 16, a clock or timer 50, FIG. 7.

Figure 7:
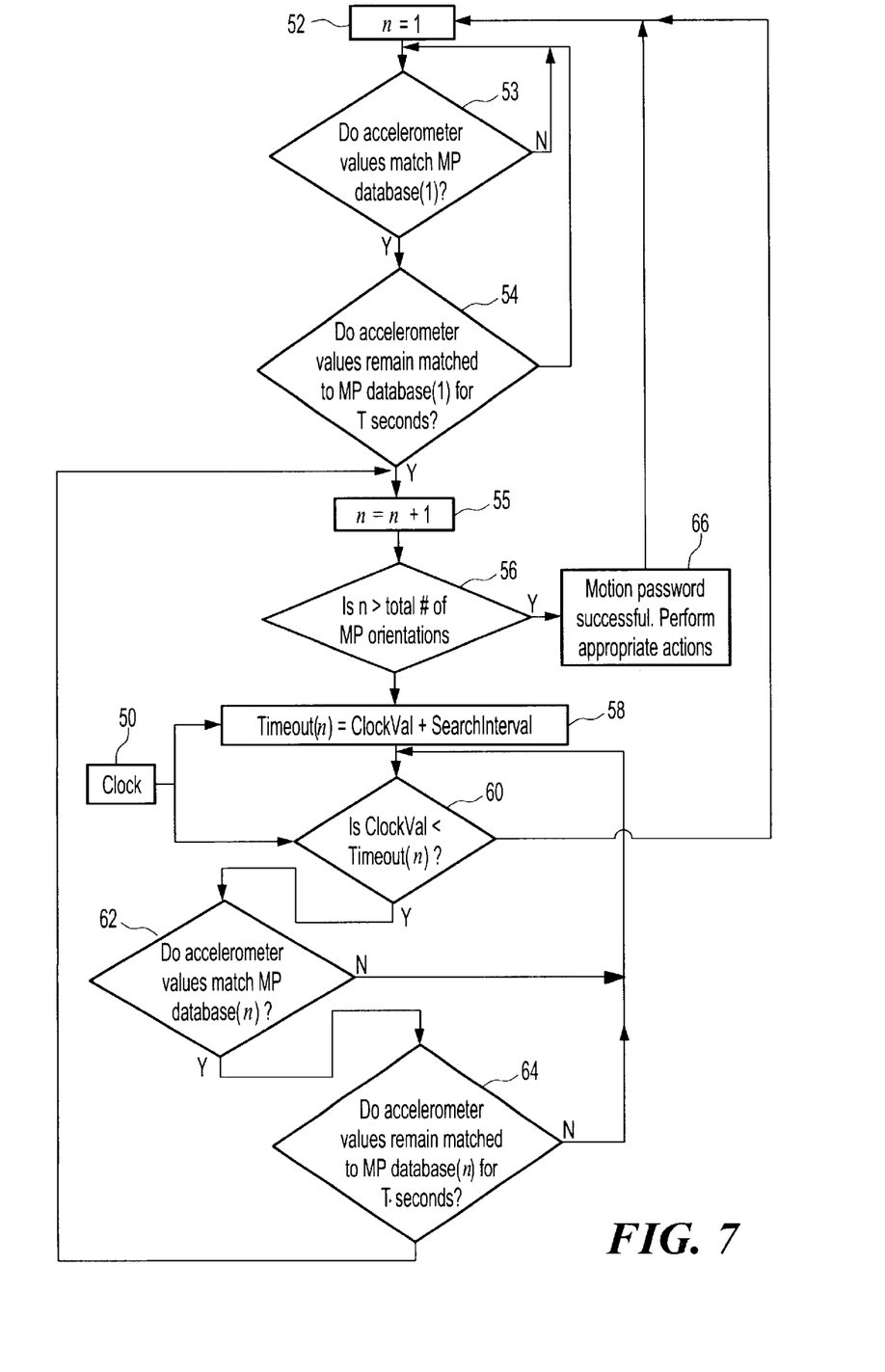
FIG. 7 is a flow chart depicting the primary operational steps associated with the computer programming of the microcontroller shown in FIG. 1.

In FIG. 7, any given "Motion Password" consists of N discreet physical orientations, n represents the Motion Password physical orientation index that is currently being searched for (i.e. for a 3-part Motion Password and there are three possible orientation indices; n can be 1, 2, or 3. If the current accelerometer values match the Motion Password database values for the current index n, those values must remain matched for duration T in order for the orientation to be considered a valid matching Motion Password orientation. ClockVal is the output of the clock (i.e. the current time). SearchInterval is the amount of time that a Motion Password orientation with index n greater than 1 will be searched for before the index n is reset to 1.

As shown in FIG. 7, the Motion Password search algorithm begins by setting the index n of the Motion Password orientation that is being searched for to 1, step 52. In step 53, Microprocessor 16 compares the outputs of Accelerometer 14 with the values at index 1 of EEPROM 18. If the values do not match, step 53 is repeated. If the values match, microprocessor 16 determines if the accelerometer 14 values remain matching for duration T, step 54. If the values do not remain matching for duration T, then step 53 is performed. If the values do remain matching for duration T, the n is incremented by 1, step 55. Next, if n is greater than the total number of orientations N defining the Motion Password, step 56, then the Motion Password is considered complete and appropriate actions are taken, step 66. If step 56 was false then a timeout for the current index n is calculated as the current time plus the duration of SearchInterval, TimeOut(n)=ClockVal+SearchInterval, step 58. Next, if the current time ClockVal is greater than or equal to the timeout for the current index n, TimeOut(n), step 60, then the index n is reset to 1 for the Motion Password orientation that is currently being searched for. If ClockVal is less than TimeOut(n) in step 60, then Microprocessor 16 compares the outputs of Accelerometer 14 with the values at index n of EEPROM 18, step 62. If the values do not match, step 60 is performed. If the values in step 62 match, then Microprocessor 16 determines if the Accelerometer 14 values remain matching for duration T, step 64. If the values do not remain matching for duration T then step 60 is performed. If values do remain matching then step 55 is performed.

The action taken in step 66, FIG. 7 may also be used in conjunction with other types of electronic devices, for example, a television remote control device which must be moved in accordance with a preselected motion password before certain television stations can be chosen. In another embodiment, simply moving a cellular telephone in accordance with one motion password causes the cellular telephone to dial one preselected telephone number while moving the cellular telephone in accordance with a different motion password causes the cellular telephone to automatically dial a different preselected number. Alternatively, the cellular telephone can be "locked" and "unlocked" by entering the motion password.

Figure 8:
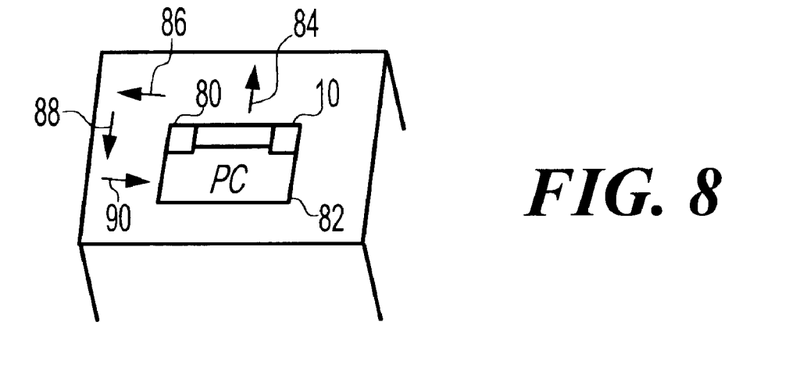
FIG. 8 is a schematic view showing how a laptop computer is oriented in accordance with the subject invention to activate or deactivate a security mechanism or an alarm.
Figure 9:
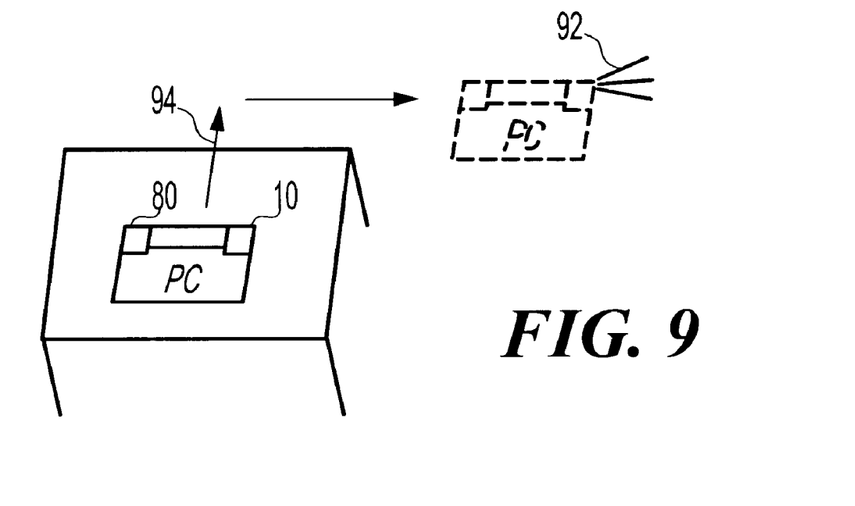
FIG. 9 is a schematic view depicting the laptop computer shown in FIG. 8 emitting an audible alarm when the laptop computer is moved if the motion password is not entered.

As shown in FIG. 8, laptop computer 82 includes both the motion password control system 10 of the subject invention and access control subsystem 80 which is programmed to either deny access to the operating system, the files, and/or the programs of laptop computer 82 and/or renders laptop computer 82 unusable in some other way. In this example, the motion password is to slide laptop computer 82 forward in the direction shown by arrow 84, to the left in the direction shown by arrow 86, rearward in the direction 88 and backward to its original position to the right as shown by arrow 90. If, however, an unauthorized user simply lifts laptop computer 82 upward as shown by arrow 94 in FIG. 9, microprocessor 16, FIG. 1 may be programmed to activate an audible alarm as shown at 92 or to activate the electronic access locking mechanism 80 as shown, or both. The sliding motions, See FIG. 8, and/or angular orientations, See FIGS. 3–6, can be discreet or continuous depending on the specific design.

Figure 10:
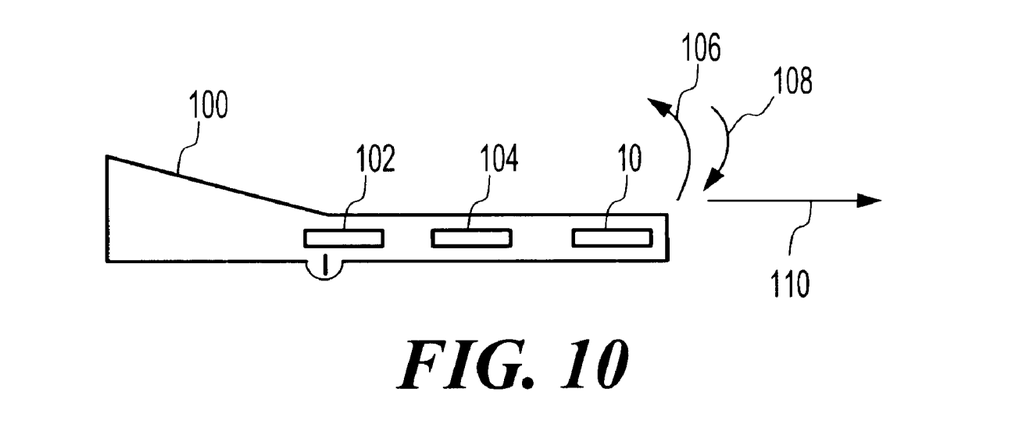
FIG. 10 is a schematic view of the control system of FIG. 1 integrated with a firearm.

The motion password control system of the subject invention is not limited to portable electronic equipment, however. As shown in FIG. 10, system 10 is integrated with firearm 100 which also includes electronically controlled firing lock subsystem 102 and/or audible alarm 104. By moving the barrel of firearm 100 in accordance with the motion password stored in the database of EPROM 18, FIG. 1, first upward as shown by arrow 106, then downward as shown by arrow 108, and then forward as shown by arrow 110, processor 16 then, and only then, deactivates alarm 104 and deactivates electronic firing lock 102. Any other movement of firearm 100 other than as shown by arrows 106, 108, and 110 results in processor 16, FIG. 1, activating alarm 104 and processor 16, FIG. 1 will not deactivate electronic firing lock 102. System 10 can also be used in conjunction with other valuable items and other electronic components. In the simplest example, any movement of the item other than in accordance with the motion password once the security mechanism is activated by entry of the motion password causes an alarm to sound.

Figure 11:
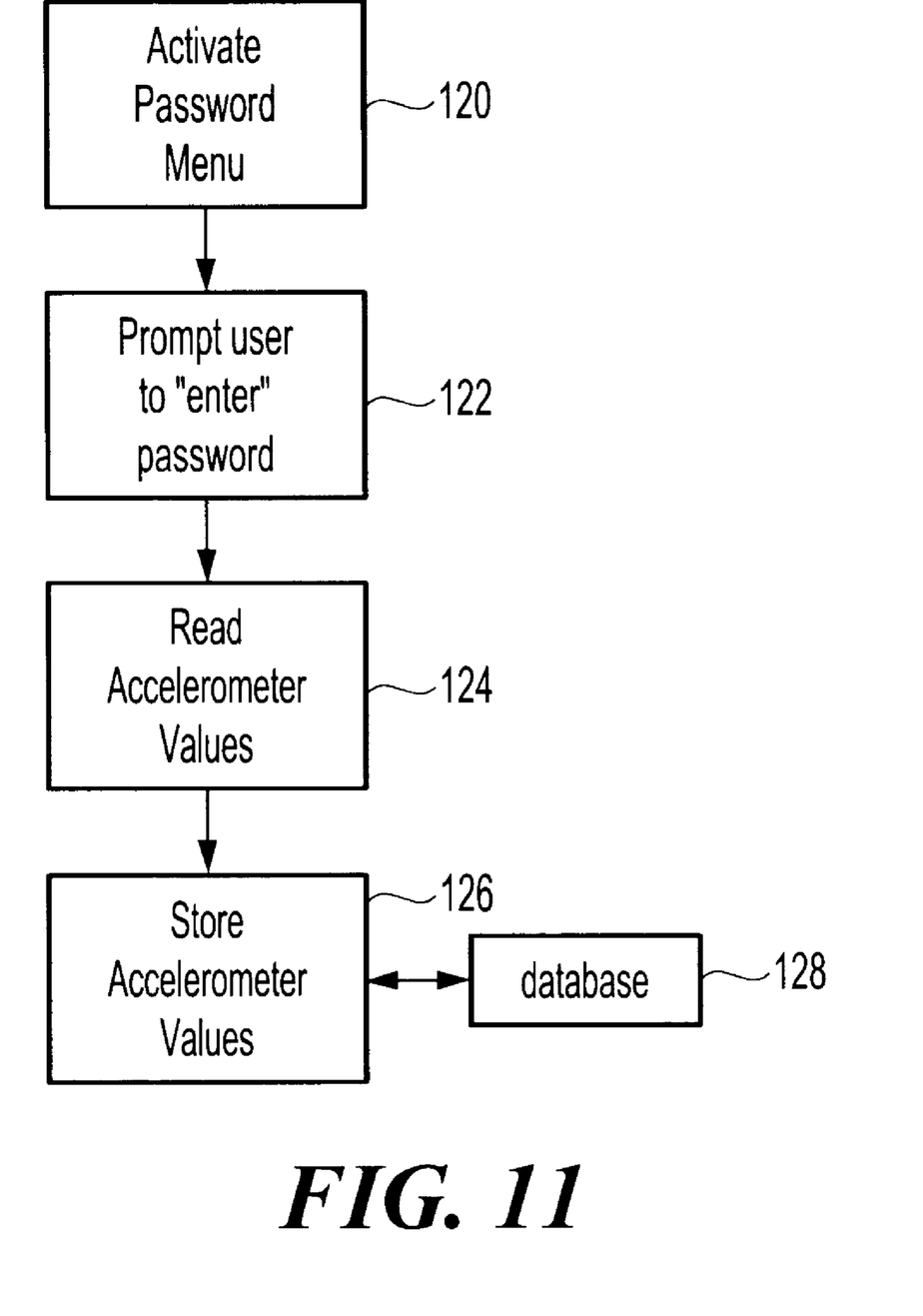
FIG. 11 is a flow chart depicting the primary operational steps associated with the software operating on the microcontroller shown in FIG. 1 in order to allow a user to enter and store the motion password.

Passwords are stored in the data base of EPROM 18, FIG. 1, by configuring processor 16 to activate a password menu, step 120, FIG. 11 displayed on the screen of the electronic device which incorporates control system 10, FIG. 1. The user is then prompted to "enter the password", step 122 by orienting electronic device three different ways as shown in FIGS. 3–6 or by continuously moving the electronic device as shown in FIG. 8 and processor 16, FIG. 1 reads the output of the accelerometer, step 124, FIG. 11 and stores those accelerometer values, step 126, in the database as shown at 128 of EPROM 18, FIG. 1.

Thus, the set of actions which can be taken when the motion password is "entered" can be to activate or deactivate a password based security subsystem, activate or deactivate a theft detection subsystem, or to initiate any function normally activated by programming choosing a new selection or some other input device or subsystem.

In the preferred embodiment, there is a time delay of several seconds after prompting the user to enter the motion password in step 122 to allow the user to select a orientation or position while the computer is on a desk and to then have a reasonable delay for positioning the computer into the desired orientation. In the preferred embodiment, audio feedback may also be provided to the user to inform her when she has reached each orientation of the motion password.

In one embodiment where device 12, FIG. 1 is a laptop computer with a security system, the present invention is used to control whether the security system is armed or disarmed. In this embodiment, the motion password algorithm is executed by a microprocessor (such as a Microchip PIC16C63A). The output pins of a motion sensor (such as an Analog Devices, Inc.'s ADXL202 accelerometer) are connected to the general purpose input pins of the microcontroller and the microcontroller performs the motion password analysis described herein in conjunction with a database of sensor values that are stored on a suitable memory device (such as a Microchip 24LC64 EEPROM chip). When the microcontroller determines that a successful motion password is performed, it toggles the state of the security system between armed and disarmed.

In this way, the need to remember passwords, personal identification numbers, and the like, the security problems associated with such identifiers and the failure of such security measures to prevent access to and/or theft of electronic devices is overcome in the subject invention.

In order to allow motion passwords which involve continuous movement instead of discrete orientations, correlation techniques and normalization techniques for matching the motions with live motion password attempts may be used. Amplitude normalization allows for amplitude independence in the motion password and temporal normalization allows for duration independence of components of the motion password. Another advantage is that the electronic device need not be powered up to utilize chip set 10, FIG. 1. Thus, the chip set may be powered by its own power source and does not require that the electronic device (i.e., computer) be powered on in order to enter a motion password. It will work both when the computer is on and when it is off.

Figure 12:
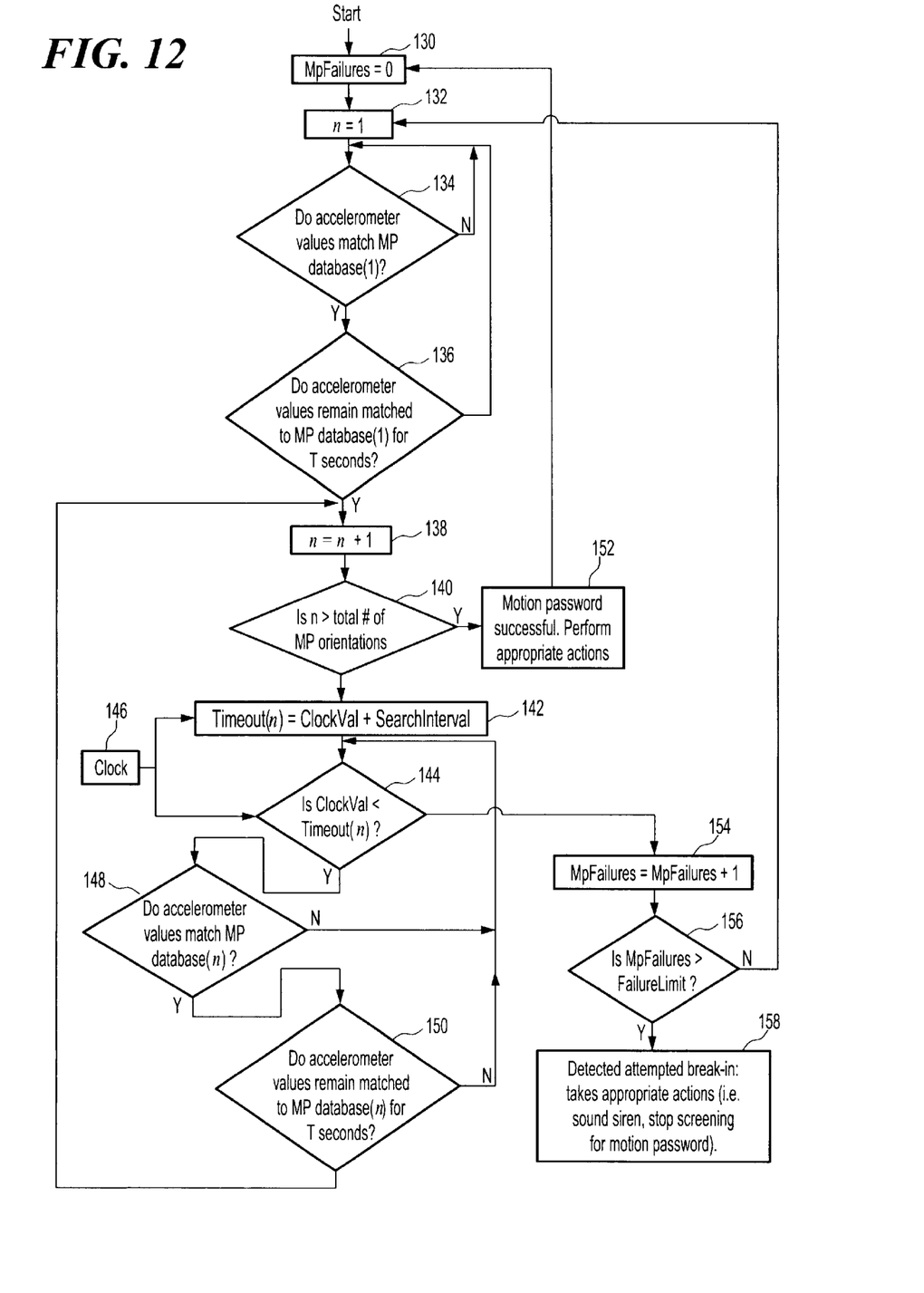
FIG. 12 is flow chart depicting the programming of the microcontroller shown in FIG. 1 in accordance with the preferred embodiment of the subject invention.

In another embodiment, the user is only allowed several attempts at entering the motion password. In FIG. 12, any given Motion Password consists of N discreet physical orientations, n represents the Motion Password physical orientation index that is currently being searched for (i.e. for a 3-part Motion Password, and the are three possible orientation indices; n can be 1, 2, or 3. If the current accelerometer values match the Motion Password database values for the current index n, those values must remain matched for duration T in order for the orientation to be considered a valid matching Motion Password orientation. ClockVal is the output of the clock (i.e. the current time). SearchInterval is the amount of time that a Motion Password orientation with index n greater than 1 will be searched for before the index n greater than 1 will be searched for before the index n is reset to 1. MpFailures is the number of sequential partially completed motion passwords. This number may be indicative of someone trying to "break in" another person's Motion Password. FailureLimit is the maximum number of allowable sequential partially completed Motion Passwords, beyond which the system is considered stolen or in danger.

As shown in FIG. 12, the Motion Password search algorithm begins by setting the counter for number of sequential partially-completed Motion Passwords, MpFailures, equal to zero, step 130. Next, the index n of the Motion Password orientation that is being searched for to 1, step 132. In step 134, microprocessor 16 compares the outputs of accelerometer 14 which the values at index 1 of EEPROM 18. If the values do not match, step 134 is repeated. If the values match, Microprocessor 16 determines if the accelerometer 14 values remain matching for duration T, step 136. If the values do not remain matching for duration T, then step 134 is performed. If the values do remain matching for duration T, then n is incremented by 1, step 138. Next, if n is greater than the total number of orientations N defining the Motion Password, step 140, then the Motion Password is considered complete and appropriate actions are taken, step 152. If step 56 was false then a timeout for the current index n is calculated as the current time plus the duration of SearchInterval, TimeOut(n)=ClockVal+SearchInterval, step 142. Next, in step 144, the current time ClockVal is compared with the timeout for the current index n, TimeOut(n). If ClockVal is less than TimeOut(n) in step 144, then Microprocessor 16 compares the outputs of accelerometer 14 with the values at index n of EEPROM 18, step 148. If the values do not match, step 144 is performed. If the values in step 148 match, then Microprocessor 16 determines of the accelerometer 14 values remain matching for duration T, step 150. If the values do not remain matching for duration T, then step 144 is performed. If the values do not remain matching for duration T, then step 144 is performed. If the values do remain matching then step 138 is performed. If ClockVal is greater than or equal to TimeOut(n) is step 144, then counter for number of sequential partially-completed Motion Passwords, MpFailures, is incremented by 1, MpFailures=MpFailures+1, step 154. If the value of MpFailures is greater than the maximum number of allowable sequential partially-completed Motion Password, step 156, then the system is considered in danger and appropriate actions are taken, step 158. If the result of step 156 is negative, then step 132 is performed next.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A motion password control system for controlling a host device comprising:
    a motion sensor responsive to motion of the device and providing a signal corresponding to movement of the device;
    a database including stored data values corresponding to predetermined motion of the device; and
    an electronic circuit responsive to the motion sensor, configured to
        compare the motion sensor signal with the stored database values,
        and in response, provide an output signal for causing the device to perform at least one action of a preselected set of actions when the comparison reveals that the device has moved in a way which corresponds to the stored data values;
        wherein the electronic circuit is further configured to detect when the motion sensor has sensed one or more partial sequences of predetermined motion data caused by an unauthorized attempt to control the system, and in response, provide an output signal for denying access to the device.

2. The motion password control system of claim 1 in which the database includes data corresponding to a set of discrete orientations of the device and the electronic circuit further includes a timer and means for determining whether any movement of the device matches the set of orientations within predetermined time periods.

3. The motion password control system of claim 1 in which the database includes motion data indicative of an authorized path of movement.

4. The motion password control system of claim 1 in which the motion sensor is an accelerometer.

5. The motion password control system of claim 1 in which the database is resident in a memory device.

6. The motion password control system of claim 5 in which the memory is a programmable read only memory.

7. The motion password control system of claim 1 in which the electronic circuit is embodied in a microcontroller.

8. The motion password control system of claim 1 in which the device is a computer.

9. The motion password control system of claim 1 in which the device includes an electronic access locking subsystem and one preselected action is to change the state of the electronic access locking subsystem.

10. The motion password control system of claim 1 in which the system further includes an audible alarm subsystem, responsive to the output signal of the electronic circuit, the audible alarm subsystem including an audible alarm and means for arming and disarming the audible alarm subsystem in response to the output signal and means for activating the audible alarm when the audible alarm subsystem is armed and movement of the device does not match the database values.

11. The motion password control system of claim 1 in which the device is a firearm with a firing locking mechanism and one of the predetermined set of actions is changing the state of the firing locking mechanism.

12. The motion password control system of claim 1 in which the electronic circuit is further configured to prompt a user of the device to enter a motion password, and store the entered motion password data values in the database.

13. A method of controlling a device, the method comprising:

sensing movement of the device;

storing in a database values corresponding to predetermined motions of the device;

comparing any motion of the device with the stored database values and, in response, providing an output signal for causing the device to perform at least one action of a preselected set of actions when the comparison reveals that the device has moved in a way which corresponds to the stored data values; and detecting when the motion sensor has sensed one or more partial sequences of predetermined motion data caused by an unauthorized attempt to control the system, and in response, providing an output signal for denying access to the device.

14. The method of claim 13 in which the database includes data corresponding to a set of discrete orientations and the method further includes determining whether any movement of the device matches the set of orientations within predetermined time periods.

15. The method of claim 13 in which the database includes motion data indicative of an authorized path of movement.

16. The method of claim 13 in which the device includes an electronic access locking mechanism and the method further includes allowing access when the movement of the device matches the database values.

17. The method of claim 13 in which the device includes an audible alarm subsystem, the method further including arming and disarming the audible alarm subsystem in response to the output signal and activating the audible alarm when the audible alarm subsystem is armed and the movement of the device does not match the database values.

18. The method of claim 13 in which the device is a firearm with a trigger locking mechanism and one of the predetermined set of actions is disarming the trigger locking mechanism.

19. The method of claim 13 further including prompting a user of the device to enter a motion password and storing the movement data values in the database.

* * * * *